United States Patent
Kim et al.

(10) Patent No.: US 10,812,230 B2
(45) Date of Patent: Oct. 20, 2020

(54) METHOD AND APPARATUS FOR CONTROLLING DATA TRANSMISSION USING INTERWORKING INTERFACE BETWEEN NR AND LTE BASE STATION

(71) Applicant: KT CORPORATION, Gyeonggi-do (KR)

(72) Inventors: Ha Sung Kim, Seoul (KR); Hyung-joon Song, Seoul (KR); Sung-Yeop Pyun, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 106 days.

(21) Appl. No.: 16/190,355

(22) Filed: Nov. 14, 2018

(65) Prior Publication Data
US 2019/0229864 A1     Jul. 25, 2019

(30) Foreign Application Priority Data

Jan. 19, 2018   (KR) .................. 10-2018-0006980
Aug. 6, 2018    (KR) .................. 10-2018-0091232

(51) Int. Cl.
*H04L 5/00*      (2006.01)
*H04W 72/04*    (2009.01)
(Continued)

(52) U.S. Cl.
CPC .......... *H04L 5/0032* (2013.01); *H04L 5/0035* (2013.01); *H04L 5/0044* (2013.01);
(Continued)

(58) Field of Classification Search
CPC . H04W 36/28; H04W 36/023; H04W 72/044; H04W 72/04216; H04W 72/1252;
(Continued)

(56) References Cited

U.S. PATENT DOCUMENTS

| | | | | |
|---|---|---|---|---|
| 10,306,529 | B2* | 5/2019 | Wang | .................. H04B 7/155 |
| 2015/0373759 | A1* | 12/2015 | Wang | ............... H04W 36/023 |
| | | | | 370/329 |

(Continued)

FOREIGN PATENT DOCUMENTS

KR   10-2017-0020812 A    2/2017
WO      2016/072039 A1    5/2016

OTHER PUBLICATIONS

NEC Corporation, 3GPP Draft; R3-141278 Transmission Status and Acceptable Buffer Size Final, (3GPP), Mobile Competence Centre; 650, Route Des Lucioles; F-06921 Sophia-Antipolos CED, vol. RAN WG3, No. Seoul, Korea;May 19, 2010-May 23, 2014 May 18, 2014, XP050795824. (Year: 2010).*

(Continued)

*Primary Examiner* — Afsar M Qureshi
(74) *Attorney, Agent, or Firm* — IP Legal Services, LLC

(57) ABSTRACT

Provided are technologies for data transmission and reception using an interworking interface between heterogeneous radio access network base stations, such as between NR and LTE, for a 5G non-standalone (NSA) network. A base station for controlling downlink data transmission may include a controller configured to setting up an X2 interface for transmitting the downlink data to a UE by interworking with another base station, a transmitter configured to transmit downlink use data information including information indicating whether to perform retransmission of an associated downlink data packet to another base station through the X2 interface, and a receiver configured to receive downlink data transfer status information from another base station through the X2 interface.

16 Claims, 9 Drawing Sheets

(51) Int. Cl.
*H04L 29/06* (2006.01)
*H04L 12/801* (2013.01)

(52) U.S. Cl.
CPC ............ *H04L 5/0091* (2013.01); *H04L 47/34* (2013.01); *H04L 69/03* (2013.01); *H04W 72/0426* (2013.01)

(58) Field of Classification Search
CPC ......... H04W 72/0413; H04W 72/1278; H04W 28/0278; H04L 5/0032; H04L 5/0035; H04L 5/0044; H04L 5/0091; H04L 47/134; H04L 69/03
USPC ........................................................ 370/329
See application file for complete search history.

(56) References Cited

U.S. PATENT DOCUMENTS

| | | |
|---|---|---|
| 2016/0029283 A1 | 1/2016 | Wang et al. |
| 2016/0029374 A1 | 1/2016 | Wang et al. |
| 2016/0029421 A1 | 1/2016 | Wang et al. |
| 2017/0257880 A1* | 9/2017 | Takano ................. H04L 1/1896 |
| 2017/0311335 A1* | 10/2017 | Hayashi .............. H04W 72/085 |
| 2018/0103406 A1 | 4/2018 | Wang et al. |
| 2019/0124572 A1* | 4/2019 | Park .................. H04W 72/0446 |

OTHER PUBLICATIONS

Ericsson et al., "Comparison of Intra-Bearer UP Architectures," R2-132714, 3GPP TSG RAN WG2 Meeting #83, Barcelona, Spain, Aug. 10, 2013. (Year: 2013).*

3GPP, "3rd Generation Partnership Project; Technical Specification Group Radio Access Network; E-UTRAN X2 interface user plane protocol (Release 12)", 3GPP TS 36.4de V0.1.1 (Aug. 2014), pp. 1-15.

* cited by examiner

FIG.4

| Bits ||||||||  NUMBER OF OCTETS |
|---|---|---|---|---|---|---|---|---|
| 7 | 6 | 5 | 4 | 3 | 2 | 1 | 0 | |
| PDU Type (=0) |||| Spare | DL Discard Blocks | DL Flush | Report polling | 1 |
| Spare |||||| Assistance Info. Report Polling Flag | Retransmission flag | 1 |
| NR-U Sequence Number |||||||| 3 |
| DL discard NR PDCP PDU SN |||||||| 0 or 3 |
| DL discard Number of blocks |||||||| 0 or 1 |
| DL discard NR PDCP PDU SN start (first block) |||||||| 0 or 3 |
| Discarded Block size (first block) |||||||| 0 or 1 |
| ... |||||||| |
| DL discard NR PDCP PDU SN start (last block) |||||||| 0 or 3 |
| Discarded Block size (last block) |||||||| 0 or 1 |
| Padding |||||||| 0-3 |

FIG.5

| Bits | | | | | | | | NUMBER OF OCTETS |
|---|---|---|---|---|---|---|---|---|
| 7 | 6 | 5 | 4 | 3 | 2 | 1 | 0 | |
| PDU Type (=0) | | | | Retrans mission | DL Discar d Blocks | DL Flush | Report p olling | 1 |
| NR-U Sequence Number | | | | | | | | 3 |
| DL discard NR PDCP PDU SN | | | | | | | | 3 |
| DL discard Number of blocks | | | | | | | | 1 |
| DL discard NR PDCP PDU SN start (first block) | | | | | | | | 3 |
| Discarded Block size (first block) | | | | | | | | 1 |
| ... | | | | | | | | |
| DL discard NR PDCP PDU SN start (last block) | | | | | | | | 3 |
| Discarded Block size (last block) | | | | | | | | 1 |
| Spare | | | Spare | | UL Flush | | Frame Version | |
| UL received NR PDCP PDU SN | | | | | | | | 3 |
| Spare extension | | | | | | | | 0-4 |

FIG. 7

| Bits | | | | | | | | NUMBER OF OCTETS |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind. | Lost Packet Report | 1 |
| Spare | | | | Data rate Ind. | Highest Retransmitted NR PDCP SN Ind | Highest Delivered Retransmitted NR PDCP SN Ind | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Highest successfully delivered retransmitted NR PDCP Sequence Number | | | | | | | | 0 or 3 |
| Highest retransmitted NR PDCP Sequence Number | | | | | | | | 0 or 3 |
| Padding | | | | | | | | 0-3 |

FIG.8

| Bits | | | | | | | | NUMBER OF OCTETS |
|---|---|---|---|---|---|---|---|---|
| 7 | 6 | 5 | 4 | 3 | 2 | 1 | 0 | |
| PDU Type (=1) | | | | Highest Transmi-ttedNR PDCP SN Ind | Highest Deliver-ed NR PDCP SN Ind | Final Frame Ind. | Lost Packet Report | 1 |
| Spare | | | | Frame Version | | Retransmission Ind | Cause Report | 1 |
| Desired buffer size for the data bearer | | | | | | | | 4 |
| Minimum desired buffer size for the UE | | | | | | | | 4 |
| Number of lost NR-U Sequence Number ranges reported | | | | | | | | 1 |
| Start of lost NR-U Sequence Number range | | | | | | | | 6* (Number of reported lost NR-U SN ranges) |
| End of lost NR-U Sequence Number range | | | | | | | | |
| Highest successfully delivered NR PDCP Sequence Number | | | | | | | | 3 |
| Highest transmitted NR PDCP Sequence Number | | | | | | | | 3 |
| Highest successfully delivered NR PDCP Sequence Numberfor retransmitteddata | | | | | | | | 3 |
| Highest transmitted NR PDCP Sequence Numberfor retransmitteddata | | | | | | | | 3 |
| Cause Value | | | | | | | | 1 |
| Spare extension | | | | | | | | 1-7 |
| Spare | Spare | Spare | | LTE RLC data rate | LTE RLC data volume | | LTE RLC buffer status | |

METHOD AND APPARATUS FOR CONTROLLING DATA TRANSMISSION USING INTERWORKING INTERFACE BETWEEN NR AND LTE BASE STATION

CROSS-REFERENCE TO RELATED APPLICATION

This application claims the priority benefit of Korean Patent Application No. 10-2018-0006980, filed on Jan. 19, 2018 and No. 10-2018-0091232, filed on Aug. 6, 2018 in the Korean Intellectual Property Office, the disclosures of which are incorporated herein by reference in their entirety.

BACKGROUND

1. Technical Field

The present disclosure relates to technologies for data transmission and reception using an interworking interface between heterogeneous radio access network base stations, such as between new radio (NR) and long term evolution (LTE), for a 5G non-standalone (NSA) network. In particular, the present disclosure relates to a method and apparatus for controlling data transmission between heterogeneous radio access network base stations.

2. Description of the Related Art

Studies on next generation mobile communication technologies have been in progress to meet demands for processing a large amount of data at a high-speed. For example, mobile communication systems have employed technologies related to the 3rd generation partnership project (3GPP), such as Long Term Evolution (LTE), LTE-Advanced, 5G, or the like. Such mobile communication systems have been developed for transmitting and receiving, at a high-speed, a large amount of various data, such as video data, radio data, or the like, in addition to voice-oriented services.

In order to process a further large amount of data at an even more faster speed, there is a need for developing a technology for using a plurality of carriers to transmit and receive data. For example, studies have been in progress for i) a carrier aggregation technique in which one base station performs communication with a UE by aggregating a plurality of carriers or ii) a dual connectivity technology in which a plurality of base stations communicate with a UE using a plurality of carriers.

Even though next generation wireless access technologies have been introduced, it will take a relatively long time to provide communication services by using only base stations employing the next generation wireless access technologies. Therefore, it is necessary to use the above described carrier aggregation or dual connectivity to provide a communication service because it is expected to use an LTE base station employing a typical radio access technology and an NR base station employing next generation radio access technologies together.

In order for transmitting and receiving data using the base stations employing the heterogeneous access technologies, it is necessary to define protocols between the base stations and to set forth a specific data separation/aggregation procedure.

SUMMARY

The present disclosure addresses the above needs, as well as others, and proposes a procedure for transmitting downlink data to a UE by cooperating with a plurality of base stations each employing different radio access technologies from the other.

In addition, the present disclosure proposes a protocol and message format for interchanging separated or aggregated data among a plurality of base stations each employing different radio access technologies from the other.

In accordance with an aspect of the present disclosure, a method of a base station may be provided for controlling downlink data transmission. The method may include configuring an X2 interface for transmitting the downlink data to a UE by interworking with another base station, transmitting downlink use data information including information indicating whether to perform retransmission of an associated downlink data packet to another base station through the X2 interface, and receiving downlink data transfer status information from another base station through the X2 interface.

In accordance with another aspect of the present disclosure, a base station may be provided for controlling downlink data transmission. The base station may include a controller configured to setup an X2 interface for transmitting the downlink data to a UE by interworking with another base station, a transmitter configured to transmit downlink use data information including information indicating whether to perform retransmission of an associated downlink data packet to another base station through the X2 interface, and a receiver configured to receive downlink data transfer status information from another base station through the X2 interface.

In accordance with embodiments of the present disclosure, a plurality of base stations each employing different wireless access technologies from the other may be able to separate and aggregate downlink data and provide the downlink data to a UE.

In addition, in accordance with embodiments of the present disclosure, it is possible to provide a next generation communication service by utilizing the typical radio access technologies.

BRIEF DESCRIPTION OF THE DRAWINGS

FIG. 4 is a diagram illustrating a frame format of downlink user data information according to at least one embodiment of the present disclosure.

FIG. 5 is a diagram illustrating a frame format of downlink user data information according to at least another embodiment of the present disclosure.

FIG. 7 is a diagram illustrating a frame format of downlink data transfer status information according to at least one embodiment of the present disclosure.

FIG. 8 is a diagram illustrating a frame format of downlink data transfer status information according to at least another embodiment of the present disclosure.

DETAILED DESCRIPTION

Figure 1:
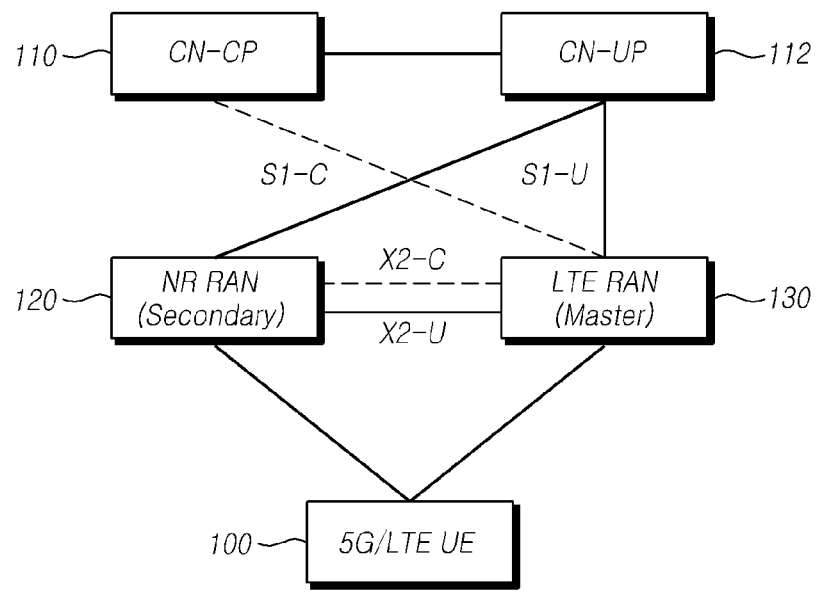
FIG. 1 is a diagram illustrating an interworking structure between an NR base station and an LTE base station according to at least one embodiment of the present disclosure.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

In the present disclosure, a wireless communication system refers to a system for providing various communication services such as a voice communication service, a packet data service, etc. The wireless communication system includes user equipment (UE) and a base station (BS).

In the present disclosure, the UE is defined as a generic term including devices using in wireless communication, such as a UE supporting wideband code division multiple access (WCDMA), long term evolution (LTE), high speed packet access (HSPA), international mobile telecommunications (IMT)-2020 (5G or new radio), or the like, or a mobile station (MS) supporting a global system for mobile communications (GSM), a user terminal (UT), a subscriber station (SS), a wireless device, or the like.

The BS or a cell generally refers to a station communicating with the UE. In the present disclosure, the BS or cell is defined as a generic term including, but not limited to, a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, and various wireless service areas thereof, such as a megacell, a macrocell, a microcell, a picocell, a femtocell, a remote radio head (RRH), a radio unit (RU), and a small cell.

The BS provides radio coverage. Each of the above-described various cells includes a BS and is controlled by the BS. Therefore the BS may be classified into two categories. 1) The BS may be an apparatus that forms and controls a corresponding wireless communication service area, such as a megacell, a macrocell, a microcell, a picocell, a femtocell, and a small cell, or 2) the BS may indicate a wireless communication service area itself. In case of 1), the BS may be i) apparatuses that provides a wireless communication service area and are controlled by an identical entity or ii) apparatuses that interact and cooperate with each other to provide a corresponding wireless communication service area. According to a method of establishing the wireless communication service area, the BS may be a point, a transmission/reception point, a transmission point, a reception point, or the like. In case of 2), the BS may denote a wireless communication service area itself to transmit or receive a signal from a UE or neighboring BS perspective.

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

In the present disclosure, the UE and the BS are entities of performing uplink and downlink communications used to embody the technology and technical conceptions described in the present disclosure. The UE and the BS are defined as a generic term and not limited to a specific term or word.

The uplink (UL) refers to data transmission/reception performed by by a UE to/from a BS, and the downlink (DL) refers to data transmission/reception performed by a BS to/from a UE.

The UL/DL transmission may be performed by utilizing i) a time division duplex (TDD) technique that performs transmission by the allocation of different time slots, ii) a frequency division duplex (FDD) technique that performs transmission by the allocation of different frequencies, or iii) a hybrid technique of the frequency division duplex (FDD) and the time division duplex (TDD).

Further, a related standard of the wireless communication system define the UL/DL to be configured based on a single carrier or a pair of carriers.

The UL and DL transmit control information through a control channel, such as a physical DL control channel (PDCCH), a physical UL control channel (PUCCH), and the like. The UL and DL transmit data through a data channel, such as a physical DL shared channel (PDSCH), a physical UL shared channel (PUSCH), and the like.

The DL may refer to communication or a communication path from multiple transmission/reception points to a device. The UL may refer to communication or a communication path from the device to the multiple transmission/reception points. In the DL, a transmitter may be a part of multiple transmission/reception points, and a receiver may be a part of the device. In the UL, a transmitter may be a part of the device, and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling transmitting RRC information containing an RRC parameter.

The BS performs DL transmission to the UE. The BS may transmit a physical DL control channel for transmitting DL control information such as scheduling required to receive a DL data channel that is a primary physical channel for unicast transmission, and scheduling approval information for transmission on an UL data channel. Hereinafter, transmission and reception of a signal through each channel will be described as transmission and reception of a corresponding channel.

Any of multiple access techniques may be applied to wireless communication systems of the present disclosure, and therefore no limitation is imposed on them. The multiple access techniques that can be used in wireless communication systems of the present disclosure may include time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments according to the present disclosure may be applicable to resource allocation in an asynchronous wireless communication evolving into LTE/LTE-advanced and IMT-2020 from GSM, WCDMA, and HSPA. Furthermore, the embodiments may be applicable to resource allocation in a synchronous wireless communication evolving into CDMA, CDMA-2000, and UMB.

In the present disclosure, a machine type communication (MTC) device may refer to a device that is low cost (or low complexity), a user equipment that supports coverage enhancement, or the like. The MTC device may refer to a device defined as a predetermined category for low costs (or low complexity) and/or coverage enhancement.

In other words, the MTC device may refer to a low cost (or low complexity) user equipment (UE) category/type newly defined in 3GPP Release-13 and performing LTE-based MTC-related operations. The MTC device may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC device may refer to a further enhanced MTC device defined in Release-14.

In the present disclosure, a narrowband Internet of Things (NB-IoT) device refers to a device supporting radio access for cellular IoT. NB-IoT technology is aimed at indoor coverage improvement, support for large-scale low-speed devices, low latency sensitivity, very low device costs, low power consumption, and optimized network architecture.

An enhanced mobile broadband (eMBB), massive machine-type communication (mMTC), and ultra reliable and low latency communication (URLLC) are proposed as representative usage scenarios for NR having been discussed in the 3GPP recently.

In the present disclosure, a 5G technology denotes all network technologies satisfying 5G requirements of ITU. The 5G technology is described as meaning including both the NR newly developed by the 3GPP and the eLTE improved the typical LTE technology to 5G requirements.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

Meanwhile, the term "NR" or "5G" may be interchangeable and is described as meaning encompassing new next generation network technologies meeting the 5G requirements described above. In addition, a radio access technology distinguished from NR is described as the typical LTE technology.

A 5G network is divided into a 5G core network (hereinafter, referred to as SGC, 5G CN, NGC etc.) and a 5G wireless access network (hereinafter, referred to as NG-RAN, 5G-RAN etc.). The NG-RAN may include a set of 5G NBs (gNBs), which are one or more 5G BS nodes. Entities constituting the core network described above may be referred to as a core network entity.

Meanwhile, a BS employing 5G radio access technologies is descried as a 5G BS, BS, or NR BS, NG-RAN, gNB, or the like, but it is not limited to these terms. In addition, a BS employing typical radio access technologies is descried as a 4G BS, another BS, or an LTE BS, eNB, or the like, but it is not limited to these terms.

There have been many researches conducted for advancing next generation radio access technologies in order to satisfy 5G requirements, such as high frequency band, large capacity data processing, and high speed data transmission/reception processing. At present, most of the communication services are provided using typical 4G (LTE) wireless access technologies. In order to provide communication services, it is required to have i) a plurality of BSs for forming a wireless communication service area and ii) a UE that supports radio access technologies employed by the plurality of BSs.

It will take a relatively long time to provide communication services by using only base stations employing the next generation wireless access technologies, such as a NR BS, since it requires changing configuration of base stations to support the next generation wireless access technologies and expanding related wireless communication service areas thereof. Furthermore, it also requires modifying core network entities accessing such a NR BS.

Accordingly, it is necessary to continuously use LTE BSs and a typical core network to provide communication service. Further, it is also necessary to utilize an NR BS where it is available for providing better quality communication services.

In the present disclosure, a Non-StandAlone (NSA) denotes a network that provide a communication service to a UE by cooperating with a NR BS and a typical BS, such as EPC BS or an LTE BS. A StandAlone (SA) denotes a network that provide a communication service to a UE by an NR BE and an NR core network.

The typical LTE radio network supports interworking using an X2 interface to support mobility management, dual connectivity and the like between LTE BSs having identical structures/functions.

With the introduction of a 5G NSA network, it is necessary for an NR BS to interwork with a typical LTE BS. In particular, when a master LTE BS serves as an anchor, it is necessary to transmit an RRC message of a secondary NR BS through the master BS. In addition, it is necessary to design interworking between NR and LTE BSs using different radio access technologies from each other in consideration of a function, bearer type and capability difference of NR and LTE BSs.

Accordingly, considering requirements of the 5G NSA network, it is necessary to design an efficient interworking interface between an NR BS and an LTE BS by expanding and changing the typical X2 interface.

Some embodiments of the present disclosure relate to a user plane interworking interface and a method of transmitting data therethrough, in a heterogeneous radio access networks between an NR BS based on a 5G NSA network and an LTE BS.

FIG. 1 is a diagram illustrating an interworking structure between an NR BS and an LTE BS according to at least one embodiment of the present disclosure.

Referring to FIG. 1, a 5G NSA network is divided into a core network (CN) for an NSA and an NR and LTE radio access network (RAN). A UE 100 may be configured to have a dual mode for connecting to both the NR BS 120 and the LTE BS 130.

The core network for the NSA is divided into a control plane (CP) function and a user plane (UP) function. The control plane (CP) function may be provided by a CN-CP device 110, and the user plane (UP) function may be provided by a CN-UP device 112 device respectively. The interface between the CN-CP device 110 and the CN-UP device 112 is performed through a standardized interface. A corresponding function of the CN-CP 110 may be performed by an MME, and a corresponding function of the CN-UP 112 may be performed by an SGW/PGW.

The core network for the NSA may support both the NR BS 120 and the LTE BS 130. Also, the interface between the CN and any of the NR BS 120 and the LTE BS 130 is interworked with an upgraded S1 interface to support the NSA network. The S1 interface is described as S1-C and S1-U depending on the control plane and the user plane respectively.

Depending on scenarios for installing a radio network by a provider and frequency characteristics to be used, the NR BS 120 or the LTE BS 130 may be a master BS, and the master BS is connected to the CN-CP device 110 through the S1-C interface. When the LTE BS 130 is set as the master BS, both the master LTE BS 130 and the secondary NR BS 120 are connected to the CN-UP device 112 through the S1-U interface. The master BS serves as an anchor node. The master BS transmits and receives control plane data to and from a core network entity. FIG. 1 illustrates that the LTE BS 130 is determined as a master BS. However, the NR BS 120 may be set as a master BS and serve as an anchor node.

Hereinafter, a procedure for transmitting/receiving user plane data between BSs will be described. In the description of the procedure, it does not focus on a type of a radio access technology employed by the master BS. That is, the procedure will be described with more focusing on the transmission/reception of DL user data through the X2 interface between a plurality of BSs, than the distinction of a master BS and a secondary BS.

Embodiments of the present disclosure will be described based on a radio bearer. However, the embodiments are not limited thereto. The embodiments are equally applicable to data transmission/reception by a QoS flow unit, which is a smaller unit. Furthermore, the embodiments will be described based on user plane data transmission and reception between BSs. However, the embodiments are not limited thereto. The embodiments are equally applicable to DL user data transmission between the CN-UP and a BS or between the CU and the DU.

Meanwhile, a directly connected interface, that is, X2 (or NSA-X2, Option 3 X2, and EN-DC X2) is defined for interworking between an NR BS and an LTE BS. The X2 interface may be considered as an inter-RAT-interworking interface between an NR BS and an LTE BS. The X2 interface is required to support the mobility of a radio section and the multi-connectivity between the NR BS and the LTE BS.

Figure 2:
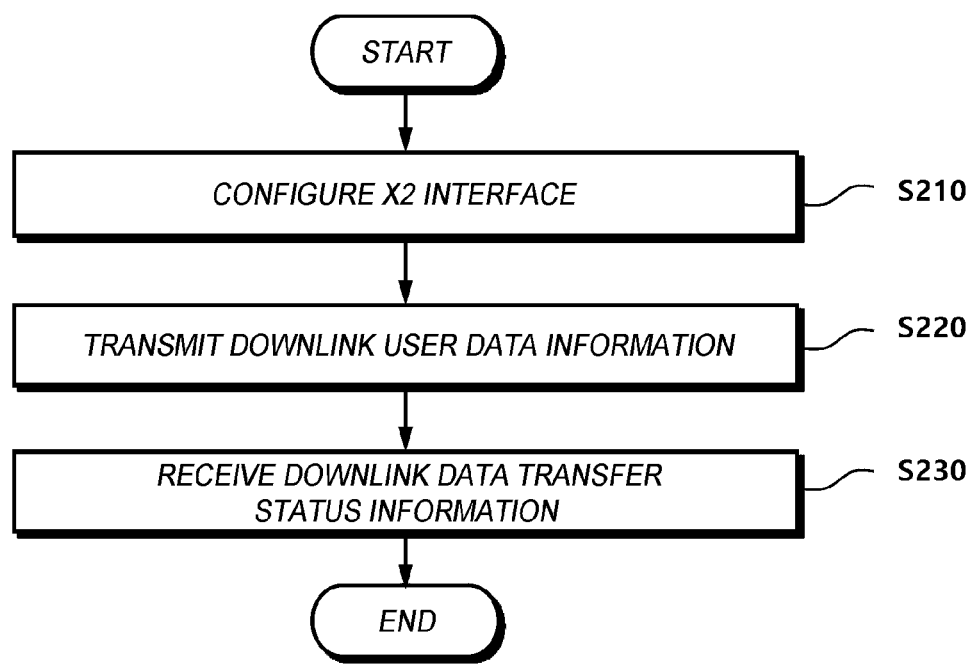
FIG. 2 is a flowchart illustrating operation of a base station according to at least one embodiment of the present disclosure.

FIG. 2 is a flowchart illustrating operation of a BS according to at least one embodiment of the present disclosure.

In particular, FIG. 2 shows a method of a BS for controlling DL data transmission. As shown in FIG. 2, at step S210, the BS configures an X2 interface for transmitting DL data to a UE by interworking with another BS.

For example, a second BS may employ a different radio access technology from a first BS, and the second BS may be a BS that transmits and receives data by configuring dual connectivity with the first BS to the UE. That is, each of the first BS and the second BS provides carriers to one UE and configures dual connectivity. In this case, unlike typical dual connectivity, the first and second BSs are configured to use heterogeneous radio access technologies.

For example, the first BS may be an NR BS, and the second BS may be an LTE BS. As another example, the first BS may be an LTE BS and the second BS may be an NR BS.

As another example, the first BS may be a node that hosts a PDCP entity, and the second BS may be a node that transmits DL data received from the PDCP entity to a UE. For example, the first BS may be a central unit (CU) responsible for the PDCP entity and a higher layer function, and the second BS may be a distributed unit (DU) for configuring RLC, MAC, and PHY entities. The central unit and the distributed unit denote a device logically/functionally separated and operated in a single BS. In the case of an NR BS, one BS may be comprised of one CU and one or more DUs.

The first and second BSs may configure dual connection to a UE, and an X2 interface may be configured between the first and second BSs to support data transmission and reception through the dual connectivity. Data can be transmitted and received between the first and second BSs through the X2 interface. In embodiments of the present disclosure, a scenario of transferring DL user data will be mainly described, so that the X2 interface may be referred to as an X2-U interface.

The first BS may perform an operation of transmitting DL user data information including information indicating whether to perform retransmission of an associated DL data packet to the second BS through the X2 interface at step S220.

For example, the first BS may transfer a DL data packet to be transmitted to a UE via the second BS to the second BS through the X2 interface. In addition, the first BS may transfer DL user data information including information indicating whether the DL data packet is a retransmission data packet to the second BS.

For example, the DL user data information may be configured in a frame format including a 4-bit PDU type field and a 1-bit retransmission flag field. The PDU type indicates a structure of an NR user plane frame. Accordingly, the PDU type field includes a PDU type value. For example, if the PDU type is 0, the "0" value is included in the PDU type field. The PDU type field may be placed in bits 4 to bits 7 in the first octet of the frame format.

Meanwhile, the retransmission flag field indicates whether an NR PDCP PDU of the DL data packet is a retransmission packet transmitted by a node (BS) that hosts the NR PDCP. For example, if the retransmission flag field is set to "1", it indicates that an associated DL data packet is a retransmission data packet.

In addition, the frame format of the DL user data information further includes i) a PDCP PDU sequence number field of the DL data packet transferred from the first BS to the second BS, in association with a specific single DRB, ii) a 1-bit DL Flush field indicating the presence of a discarded DL PDCP PDU sequence number, and iii) a 1-bit DL Discard Blocks field indicating the presence of a DL PDCP PDU block to be discarded.

The frame format of the DL user data information may include the PDU type field, the retransmission flag field, the PDCP PDU sequence number field, the DL Flush field, and the DL Discard Blocks field, as mandatory fields.

In addition, the DL user data information may include, as an optional field, at least one of the number of blocks, a block size, and a sequence number for a PDCP PDU discarded or to be discarded according to the indication information included in a mandatory field. For example, when a discarded PDCP PDU is present, information on a discarded PDCP PDU sequence number, the DL user data information may include, as optional fields, information on the number of discarded blocks, start information of the discarded PDCP PDU sequence number for each block, and discarded block size information.

In addition, the DL user data information may include frame version information for a frame format in which the corresponding information is transmitted. For example, the DL user data information may include a frame version field including version information for a frame version of the corresponding information as a mandatory or optional field. The second BS receiving the DL user data information may recognize the DL user data information by checking the information of the corresponding frame version field and then by identifying or modifying the frame format.

A more specific frame format and information included in each field will be described in detail below with reference to drawings.

The first BS may perform an operation of receiving DL data transfer status information from the secondary BS through the X2 interface at step S230. The secondary BS having received a DL data packet and DL user data information associated with the DL data packet may transmit the received packet and information to a UE. In addition, the second BS transmits DL data transfer status information to the first BS to inform the first BS of information on a transfer status.

For example, the DL data transfer status information may include PDU type information and retransmission status information of a DL data packet.

Specifically, the frame format of the DL data transfer status information is configured to contain, as mandatory fields, a 4-bit PDU type field, a 1-bit data rate indication field, a 1-bit retransmission transfer field indicating whether a highest success retransmission PDCP sequence number field is present or not, and a 1-bit retransmission field indicating whether a highest retransmission PDCP sequence number field is present or not.

Here, the highest success retransmission PDCP sequence number field may include information on a sequential transfer status of a PDCP PDU of a DL data packet retransmitted by the secondary BS to a UE, and the highest retransmission PDCP sequence number field may include status information on a PDCP PDU of a retransmission DL data packet transferred by the secondary BS to a lower layer.

Specifically, for example, the highest success retransmission PDCP sequence number field may include highest PDCP PDU sequence number information of the DL data packet successfully retransmitted by the secondary BS to the UE, and the highest retransmission PDCP sequence number field may include highest PDCP PDU sequence number information of the retransmission DL data packet transferred by the secondary BS to the lower layer.

In addition, the DL data transfer status information may further include a lost packet report field, a cause information field, a desired data rate field, and the like, and specific fields will be described in detail below with reference to drawings.

The value of the data rate indication field may be set to a value indicating the presence of the desired data rate field. For example, the desired data rate field may include information on the amount of data desired to be received for a predetermined period of time for a specific data radio bearer configured in a UE. Here, the predetermined period of time may be set to 1 second, and the amount of data desired in this case may mean a data rate per second.

In addition, the DL data transfer status information may include frame version information on a frame format in which the corresponding information is transmitted. For example, the DL data transfer status information may include a frame version field including version information for a frame version of the corresponding information as a mandatory or optional field. The first BS (node) receiving the DL data transfer status information may recognize the DL data transfer status information by checking the information of the corresponding frame version field and then by identifying or modifying the frame format.

Hereinafter, each operation step of the method will be described with reference to the accompanying drawings. Furthermore, a frame format of information transferred in each operation step will be described in detail.

Figure 3:
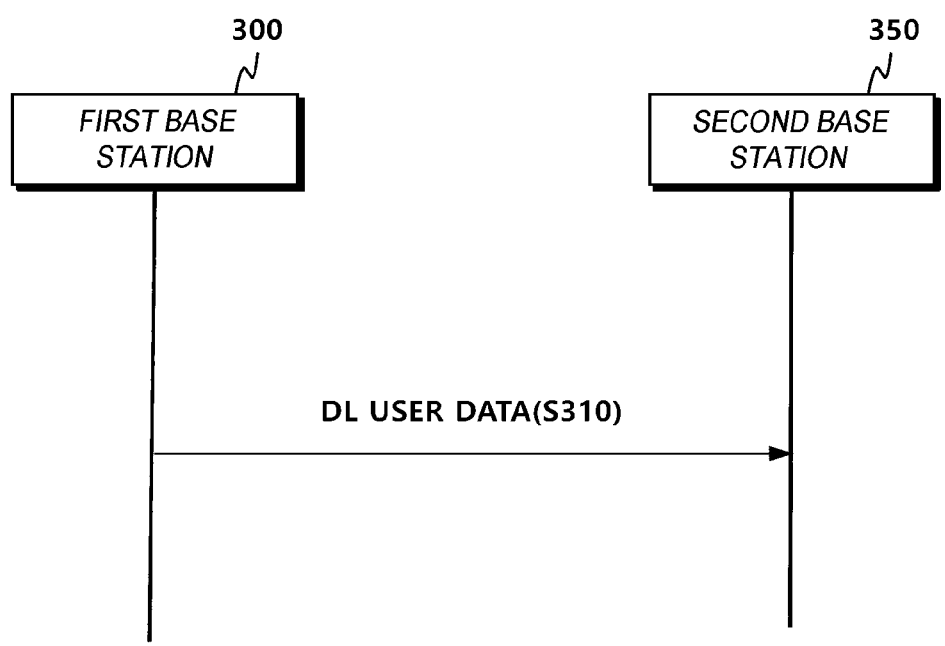
FIG. 3 is a signal diagram illustrating a procedure for transferring downlink user data information according to at least one embodiment of the present disclosure.

FIG. 3 is a signal flow diagram illustrating a procedure for transferring DL user data information according to at least one embodiment of the present disclosure.

Referring to FIG. 3, a first BS 300 transmits DL user data information to a second BS 350 at step S310. The DL user data information is transmitted through an X2 interface and may be transmitted through an X2 user plane (X2-U) interface. For example, the user plane protocol (X2-U or NR-U) of the X2 interface is used to transfer DL user data from the first BS 300 to the second BS 350 on a per PDCP PDU (Packet Data Units) basis. To do this, it is essential from in terms of multi-vendor interoperability (MVI) to use an updated DL user data format, which is also acceptable to an NR BS, obtained by expanding and/or modifying a DL user data format used in an interworking interface between X2 BSs of the LTE.

In addition, as described above, the first BS 300 may denote an NR BS or a node hosting an NR PDCP entity, and the second BS 350 may denote an LTE BS or a node associated with an NR PDCP entity. Meanwhile, in a SA network, the first BS 300 may indicate an NR PDCP host NR BS, and the second BS 350 may indicate an NR BS corresponding to the first BS 300. Also, as described above, the first BS 300 may denote a CU and the second BS 350 may denote DU. In this case, an F1 interface other than the X2 interface may be used for DL user data information transmission.

DL user data information may be transmitted to provide i) NR-U SN (Sequence Number) information required for transmission of a DL NR PDCP PDU packet from the first BS 300 to the second BS 350 and ii) information for indicating whether to perform retransmission. In addition, the DL user data information may include a frame version field including information on a frame format version of the corresponding information.

Specifically, the frame format of the DL user data information may have a frame format as shown in FIG. 4 or 5 below.

FIG. 4 is a diagram illustrating a frame format of DL user data information according to an embodiment of the present disclosure.

Referring to FIG. 4, the DL user data information may have a frame format including mandatory fields in three octets.

The mandatory fields may include a PDU Type field, a Retransmission flag field, a PDCP PDU Sequence Number field, a DL Flush field, a DL Discard Blocks field, a Report polling field, and an Assistance information Report Polling Flag field. In addition, one or more Spare fields may be included as a mandatory field, and the Spare field value may be set to "0". If the Spare field value is set to "1", the secondary BS having received the corresponding frame format may release an associated radio bearer.

Each field may have a predetermined number of bits set in advance as shown in FIG. 4, and may include information.

For example, the PDU Type field includes information on a structure of an NR user plane frame. In addition, the DL Discard Blocks field includes information indicating the presence of a DL PDCP PDU block to be discarded. The DL Flush field includes information indicating the presence of a discarded DL PDCP PDU sequence number. The Retransmission flag field includes information indicating whether a PDCP PDU of an associated DL data packet is a retransmission packet. The NR-U Sequence Number field includes information on a sequence number of the PDCP PDU of the associated DL data packet.

In addition, the frame format of the DL user data information may include one or more optional fields. Each optional field may or may not include information by information included in the above-described mandatory fields.

For example, the DL Flush field indicates whether information is included in a DL discard NR PDCP PDU SN field. The DL discard NR PDCP PDU SN field includes PDCP PDU sequence number information of a discarded DL data packet.

As another example, the DL Discard Blocks field indicates whether information is included in a DL discard Number of blocks field, the DL discard NR PDCP PDU SN start field, and the Discarded Block size field. The DL discard Number of blocks field includes information on the number of discarded PDCP PDU blocks. The DL discard NR PDCP PDU SN start field includes information on a sequence number of a start PDCP PDU of a discarded PDCP PDU block to be discarded. The Discarded Block size field includes information on the size of a PDCP PDU block to be discarded. Accordingly, information on the PDCP PDU block to be discarded may be transferred through a start sequence number, a size, and the number of blocks.

In addition, the frame format of the DL user data information may include a frame version field including frame version information on the frame format in which corresponding information is transmitted. The second BS receiving the DL user data information may recognize DL user data information by checking information of the corresponding frame version field and then by identifying and/or modifying the frame format.

Meanwhile, positions in the frame format of each field described in FIG. 4 may be changed, and the size of each field may be added or subtracted. In addition, each field is named as shown in FIG. 4 for convenience of description and ease of understand, but the embodiments are not limited thereto. Hereinafter, a frame format according to another embodiment, which is configured differently from the frame format of FIG. 4, will be described with reference to FIG. 5.

FIG. 5 is a diagram illustrating a frame format of DL user data information according to another embodiment of the present disclosure.

Referring to FIG. 5, the frame format of DL user data information includes a PDU Type field, a Retransmission flag field, a PDCP PDU sequence number field, a DL Flush field, a DL Discard Blocks field, and a Report polling field, similar to the frame format shown in FIG. 4.

In addition, the frame format may include a DL discard NR PDCP PDU SN field, a DL discard Number of blocks field, a DL discard NR PDCP PDU SN start field, and a Discarded Block size field. The information contained in each field is identical or similar to the frame format described with reference to FIG. 4.

Unlike to the frame format of FIG. 4, the frame format of FIG. 5 may include a UL Flush field and a UL received NR PDCP PDU SN field, associated with the UL. In addition, the frame format may further include a Frame Version field.

For example, the Frame Version field includes information on a frame version (or S/W version) used by the first BS (transmitting node). The second BS (receiving node) checks whether its format version matches a format version of the first BS (transmitting node) using the information of the corresponding field, if not, and then performs format conversion based on the format version of the second BS (receiving node), or one or more portions different from the format version of the second BS may be ignored for processing. In this way, information may be exchanged even in different versions.

As another example, the Retransmission field includes information indicating (ex, 0 or 1) whether a DL data packet associated with DL user data information corresponds to a retransmission packet. In the case of a PDU format in which retransmission is not supported, the corresponding Retransmission field may be deleted.

As another example, in case an UL data packet is transmitted from a UE to both the first BS and the second BS, an LTE BS may not need to receive the packet if an NR BS receives the packet. To indicate this, an UL Flush field and an UL received NR PDCP PDU SN field may be defined and included in the DL user data information. The UL Flush field may contain information for informing that packet reception is not required by the LTE BS. The UL received NR PDCP PDU SN field may include information on a sequence number of a packet on which UL reception is not required by the LTE BS.

Meanwhile, the DL user data information may include frame version information for a frame format. For example, the DL user data information may include a frame version field including version information for a frame version of the corresponding information as a mandatory or optional field. The second BS receiving the DL user data information may recognize DL user data information by checking information of the corresponding frame version field and then by identifying and/or modifying the frame format.

In addition, the frame format of the DL user data information may be configured in various forms, and all or some of the above-described information may be included.

Figure 6:
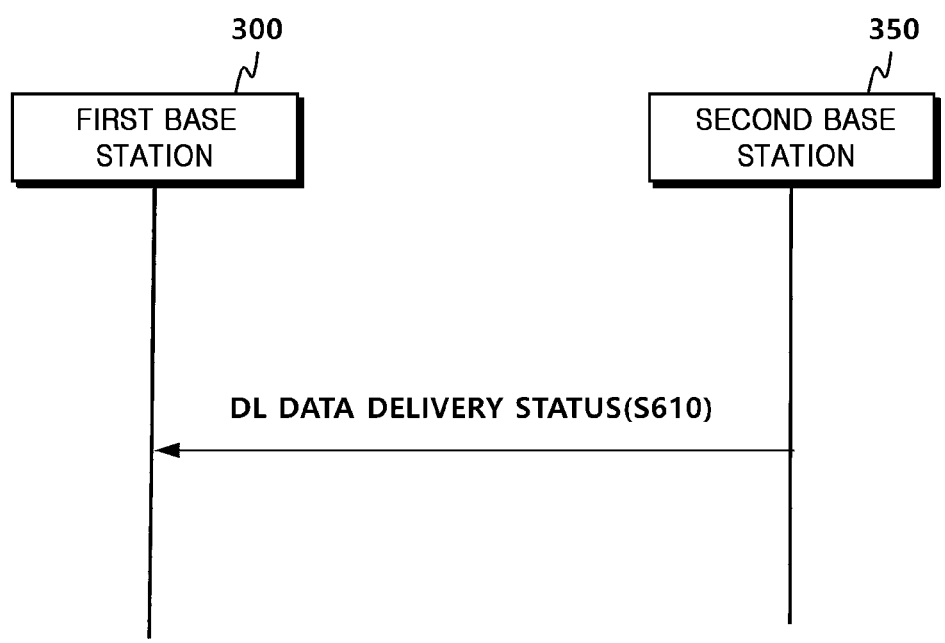
FIG. 6 is a diagram illustrating a procedure for transferring downlink data transfer status information according to at least one embodiment of the present disclosure.

FIG. 6 is a diagram illustrating a procedure for transferring DL data transfer status information according to at least one embodiment of the present disclosure.

Referring to FIG. 6, a second BS 350 transmits DL data transfer status information to a first BS 300 at step S610. The DL data transfer status information includes information on a transfer status of DL data transferred from the first BS 300 to the second BS 350 to a UE. Through this, the first BS 300 may identify a data transfer status of the second BS 350, a normal transmission status of retransmitted data, and/or the like, and then can use the identified result for data separation/aggregation transmission determination. In addition, the second BS 350 may provide feedback to the first BS 300 and thus help the first BS 300 control a flow(s) for each bearer.

The DL data transfer status information may also have a frame format including various fields. Hereinafter, a frame format of DL data transfer status information will be described with reference to the accompanying drawings. However, the embodiments are not limited to sizes and names of fields described in the accompanying drawings and related descriptions.

FIG. 7 is a diagram illustrating a frame format of DL data transfer status information according to an embodiment of the present disclosure.

Referring to FIG. 7, the DL data transfer status information may include PDU type information and retransmission status information of a DL data packet.

For example, the frame format of the DL data transfer status information may include, as mandatory fields. a PDU Type field, a Highest Transmitted NR PDCP SN Ind. field, a Highest Delivered NR PDCP SN Ind. field, a Final Frame Ind. field, a Lost Packet Report field, a Spare field, a Data rate Ind. field, a Highest Retransmitted NR PDCP SN Ind.

field, a Highest Delivered Retransmitted NR PDCP SN Ind. field, and/or a Desired buffer size field.

In addition, the DL data transfer status information may, as an optional field, include a Desired Data Rate field associated with the data rate. The DL data transfer status information may include a Number of lost NR-U Sequence Number ranges reported field, a Start of lost NR-U Sequence Number range field, an End of lost NR-U Sequence Number range field, associated with a lost data packet, as optional fields.

In addition, the DL data transfer status information may include a Highest successfully delivered NR PDCP Sequence Number field, a Highest transmitted NR PDCP Sequence Number field, a Cause Value field, a Highest successfully delivered retransmitted NR PDCP Sequence Number field, and a Highest retransmitted And an NR PDCP Sequence Number field, associated with a data transfer status to a UE, as optional fields.

Hereinafter, each field will be described in detail. The PDU Type field includes information on a structure of an NR user plane frame. The Highest Delivered NR PDCP Sequence Number field and the Highest Delivered NR PDCP SN Ind. field indicate information indicating whether the Highest Delivered NR PDCP Sequence Number field and the Highest successfully delivered NR PDCP Sequence Number field are present or not, respectively. The Final Frame Ind. field includes information indicating whether the frame of the DL data transfer status information is the last frame or not. The Lost Packet Report field includes information on whether the Number of lost NR-U Sequence Number ranges reported field, the Start of lost NR-U Sequence Number range field, and the End of lost NR-U Sequence Number range field are present or not.

Similarly, the Data rate Ind. field includes information indicating whether the Desired Data Rate field is present or not. A value of the Data rate Ind. field may indicate the presence of the Desired Data Rate field. The Desired Data Rate field may include information on the amount of data desired to be received for a predetermined period of time for a specific data radio bearer configured in a UE. Here, the predetermined period of time may be set to 1 second, and the amount of data required in this case may mean a data rate per second.

The Highest Retransmitted NR PDCP Sequence Number field and the Highest Delivered Retransmitted PDCP SN Ind. field indicate whether the Highest Retransmitted NR PDCP Sequence Number field and the Highest successfully delivered retransmitted NR PDCP Sequence Number field are present or not, respectively. The Cause Report field contains information on whether the Cause Value field is present or not.

The Desired Buffer Size field contains desired buffer size information for the corresponding data radio bearer.

Meanwhile, in case the Highest Delivered Retransmitted NR PDCP SN Ind. field indicates the presence of the Highest successfully delivered retransmitted NR PDCP Sequence Number field, the Highest successfully delivered retransmitted NR PDCP Sequence Number field includes information on a sequential transfer status of a PDCP PDU of a DL data packet retransmitted from the second BS to a UE. That is, the Highest successfully delivered retransmitted NR PDCP Sequence Number field includes highest PDCP PDU sequence number information of the DL data packet successfully retransmitted from the first BS to the UE.

In addition, in case the Highest Delivered Retransmitted NR PDCP SN Ind. field indicates the presence of the Highest retransmitted NR PDCP Sequence Number field, the Highest retransmitted NR PDCP Sequence Number field includes status information on a PDCP PDU of a retransmitted DL data packet transferred from the second BS to a lower layer. That is, the Highest retransmitted NR PDCP Sequence Number field includes the highest PDCP PDU sequence number information of the retransmitted DL data packet transferred from the second BS to the lower layer.

In addition, the DL data transfer status information may include information on a frame version of a frame format. For example, the DL data transfer status information may include a frame version field including version information for a frame version of corresponding information as a mandatory or optional field. The first BS (node) receiving the DL data transfer status information may recognize the DL data transfer status information by checking the information of the corresponding frame version field and then by identifying or modifying the frame format.

FIG. 8 is a diagram illustrating a frame format of DL data transfer status information according to another embodiment of the present disclosure.

The frame format of FIG. 8 may include fields identical or similar to that of FIG. 7. Furthermore, such identical or similar files may have different bits and positions. Description of the identical fields will be omitted herein.

The frame format of the DL data transfer status information may include a Frame Version field. The Frame Version field includes information on a frame version (or S/W version) used by a second BS (transmitting node). A first BS (receiving node) checks whether its format version matches a format version of the second BS (transmitting node) using the information of the corresponding field, if not, and then performs format conversion based on the format version of the first BS (receiving node), or one or more portions different from the format version of the first BS may be ignored for processing. In this way, information may be exchanged even in different versions.

The frame format of the DL data transfer status information may include a field for RLC data status information of the second BS.

In an example, the frame format of the DL data transfer status information may include an LTE RLC buffer status field. The LTE RLC buffer status field may include data buffer status information at an RLC layer in the LTE BS (or DU). The data buffer status information may be information calculated on a per-individual bearer or per-individual UE basis.

As another example, the frame format of DL data transfer status information may include an LTE RLC data volume field including data usage information at the RLC layer in the LTE BS (or DU). The data usage information may be information calculated on a per-individual bearer or per-individual UE basis.

As another example, the frame format of the DL data transfer status information may include an LTE RLC data rate field including information on a data rate at the RLC layer in the LTE BS (or DU). The information on the data rate may include information on an average rate or a maximum rate for a predetermined period of time. The data rate information may be information calculated on a per-individual bearer or per-individual UE basis.

In addition, fields related to the successful transfer of the retransmission data described above may be included. For example, the frame format may include a Retransmission Ind. field indicating whether to include a field for a retransmission packet.

In addition, the DL data transfer status information may include information on a frame version of a frame format.

For example, the DL data transfer status information may include a frame version field including version information for a frame version of the corresponding information as a mandatory or optional field. The first BS (node) receiving the DL data transfer status information may recognize the DL data transfer status information by checking the information of the corresponding frame version field and then by identifying or modifying the frame format.

In addition, the frame format may include a Highest successfully delivered PDCP Sequence Number for retransmitted data field including highest PDCP PDU sequence number information of a DL data packet successfully retransmitted form the second BS to the UE. This field contains the same information as the highest success retransmission PDCP sequence number field of FIG. 7.

In addition, the frame format may include a Highest transmitted NR PDCP Sequence Number for retransmitted data field including highest PDCP PDU sequence number information of a retransmitted DL data packet transferred form the second BS to a lower layer. This field contains the same information as the highest retransmission PDCP sequence number field of FIG. 7.

In the case of a PDU format in which retransmission is not supported, this field may be omitted.

In addition, the frame format of FIG. 8 may include fields including the same information as some fields of each frame format described in FIG. 7.

As described above, in case DL data are transferred over the X2 interface, it is possible to effectively transmit and receive the DL data between BSs using radio access technologies different from one another through expansion and/or modification of a frame format of information to be transferred. In addition, it is possible to provides more stable connectivity and mobility by effective MVI interworking of an NR and LTE BS apparatus between heterogeneous vendors through user plane interfacing interface between heterogeneous radio access network BSs using NR and LTE radio technology. It is also possible to save significantly cost required to install and operate a radio network.

Figure 9:
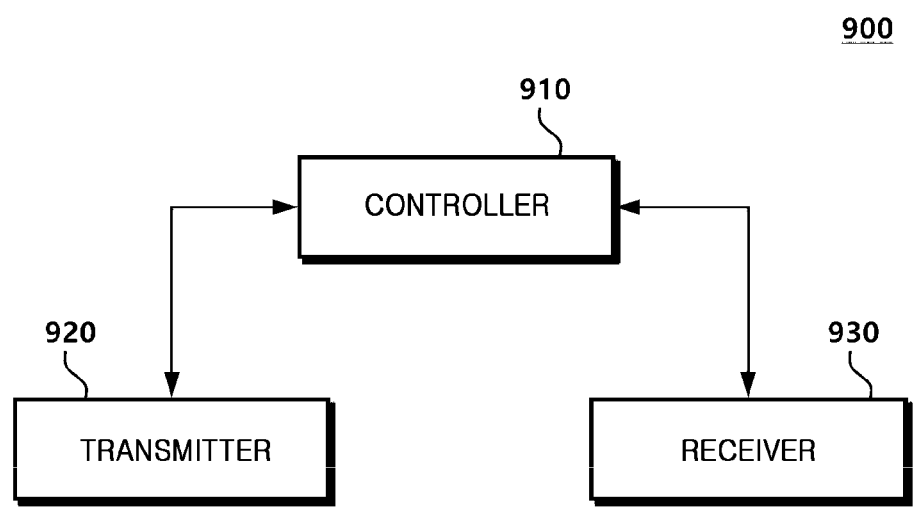
FIG. 9 is a block diagram illustrating a base station configuration according to at least one embodiment of the present disclosure.

FIG. 9 is a block diagram illustrating a BS according to at least one embodiment of the present disclosure.

Referring to FIG. 9, a BS 900 (hereinafter, for convenience of description, referred to as a first BS) includes a controller 910 configured to establish an X2 interface for transmitting DL data to a UE by interworking with another BS (hereinafter, for convenience of description, referred to as a second BS), a transmitter 920 configured to transmit DL use data information including information indicating whether to perform retransmission of an associated DL data packet to the second BS through the X2 interface, and a receiver 930 configured to receive DL data transfer status information from the second BS through the X2 interface.

As described above, the second BS may be configured to use a different radio access technology from that of the first BS, and the second BS may denote a BS that transmits and receives data by configuring dual connectivity with the first BS to the UE. As another example, the first BS may be an NR BS, and the second BS may be an LTE BS. As another example, the first BS may be an LTE BS, and the second BS may be an NR BS. As another example, the first BS may be a node that hosts a PDCP entity, and the second BS may be a node that transmits DL data received from the PDCP entity to a UE. For example, the first BS may be a central unit (CU) responsible for a PDCP entity and a higher layer function, and the second BS may be a distributed unit (DU) for configuring RLC, MAC, and PHY entities.

For example, the first BS may transfer a DL data packet to be transmitted to a UE via the second BS to the second BS through the X2 interface. In addition, the first BS may transfer DL user data information including information indicating whether the DL data packet is a retransmission data packet to the second BS.

Meanwhile, the DL user data information may include a frame format including a 4-bit PDU type field and a 1-bit retransmission flag field. The retransmission flag field indicates whether an NR PDCP PDU of the DL data packet is a retransmission packet transmitted by a node (BS) that hosts an NR PDCP.

In addition, the frame format of the DL user data information further includes i) a PDCP PDU sequence number field of the DL data packet transferred from the first BS to the second BS, in association with a specific single DRB, ii) a 1-bit DL Flush field indicating the presence of a discarded DL PDCP PDU sequence number, and iii) a 1-bit DL Discard Blocks field indicating the presence of a DL PDCP PDU block to be discarded. The PDU Type field, the Retransmission flag field, the PDCP PDU sequence number field, the DL Flush field, and the DL Discard Blocks field described above may be included as mandatory fields in the frame format of the DL user data information.

In addition, at least one of the number of blocks, a block size, and a sequence number for a PDCP PDU discarded or to be discarded according to the indication information included in a mandatory field may be included as at least one optional field in the DL user data information. For example, in case a discarded PDCP PDU is present, the frame format of the DL user data information may include, as optional fields, information on a discarded PDCP PDU sequence number, information on the number of discarded blocks, start information of the discarded PDCP PDU sequence number for each block, and discarded block size information.

In addition, the DL user data information may include frame version information on a version of a frame format in which the corresponding information is transmitted. For example, the DL user data information may include a frame version field including version information for a frame version of the corresponding information as a mandatory or optional field. The second BS receiving the DL user data information may recognize DL user data information by checking information of the corresponding frame version field and then by identifying and/or modifying the frame format.

The receiver 930 is configured to receive from the second BS transmission status information on a DL data packet transmitted from the second BS to a UE.

For example, the DL data transfer status information may include PDU type information and retransmission status information of a DL data packet. Specifically, the frame format of the DL data transfer status information includes, as mandatory fields, a 4-bit PDU type field, a 1-bit data rate indication field, a 1-bit retransmission transfer field indicating whether a highest success retransmission PDCP sequence number field is present or not, and a 1-bit retransmission field indicating whether a highest retransmission PDCP sequence number field is present or not.

Here, the highest success retransmission PDCP sequence number field may include information on a sequential transfer status of a PDCP PDU of a DL data packet retransmitted by the secondary BS to a UE, and the highest retransmission PDCP sequence number field may include status information on a PDCP PDU of a retransmission DL data packet transferred by the secondary BS to a lower layer. For example, the highest success retransmission PDCP sequence number field may include highest PDCP PDU sequence number information of the DL data packet successfully retransmitted by the secondary BS to the UE, and the highest retransmission PDCP sequence number field may include highest PDCP PDU sequence number information of the retransmission DL data packet transferred by the secondary BS to the lower layer.

The value of the data rate indication field may be set to a value indicating the presence of a desired data rate field. For example, the desired data rate field may include information on the amount of data desired to be received for a predetermined period of time for a specific data radio bearer configured in a UE.

In addition, the DL data transfer status information may include frame version information on a frame format in which the corresponding information is transmitted. For example, the DL data transfer status information may include a frame version field including version information for a frame version of the corresponding information as a mandatory or optional field. The first BS (node) receiving the DL data transfer status information may recognize the DL data transfer status information by checking the information of the corresponding frame version field and then by identifying or modifying the frame format.

In addition, the controller 910 configures an X2 interface needed for performing embodiments described above and controls overall operations of the first BS 900 for transmitting/receiving DL user data information and DL data transfer status information to/from the second BS.

In addition, the transmitter 920 and the receiver 930 are used to transmit or receive signals, messages, data required to perform embodiments described above to or from a UE.

The terms "system", "processor", "controller", "component", "module", "interface", "model", "unit", and the like, described above may generally refer to computer-related entity hardware, a combination of hardware and software, software, or software in execution. For example, components described above may be, but are not limited to, a process driven by a processor, a processor, a controller, a control processor, an entity, an execution thread, a program and/or a computer. For example, an application running on a controller, controller or processor can be a component. One or more components can be included within a process and/or thread of execution, and a component can be placed on one system or be disposed on more than one system.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of the present disclosure shall be construed on the basis of the accompanying claims in such a manner that all of the technical ideas included within the scope equivalent to the claims belong to the present disclosure.

What is claimed is:

1. A method of controlling downlink data transmission by a base station, the method comprising:
   configuring an X2 interface for transmitting downlink data to user equipment by interworking with a second base station;
   transmitting downlink user data information including information indicating whether to perform retransmission of an associated downlink data packet to the second base station through the X2 interface; and
   receiving downlink data transfer status information from the second base station through the X2 interface,
   wherein the downlink user data information is configured in a frame format including a 4-bit protocol data unit (PDU) type field and a 1-bit retransmission flag field, and
   wherein the frame format of the downlink user data information further includes a PDCP PDU sequence number field of the downlink data packet transferred from the base station to the second base station, in association with a specific single Data Radio Bearer (DRB), a 1-bit DL Flush field indicating presence of a discarded downlink PDCP PDU sequence number, and a 1-bit DL Discard Blocks field indicating presence of a downlink PDCP PDU block to be discarded.

2. The method according to claim 1, wherein the second base station is configured to employ a radio access technology different from the base station and configures dual connectivity with the base station for the user equipment to transmit and receive data.

3. The method according to claim 1, wherein the base station is a node that hosts a packet data convergence protocol (PDCP) entity, and the second base station is a node that transmits downlink data received from the PDCP entity to the user equipment.

4. The method according to claim 1, wherein the frame format of the downlink user data information includes the PDU Type field, a Retransmission flag field, a PDCP PDU sequence number field, a DL Flush field, a DL Discard Blocks field, as mandatory fields, and includes at least one optional field including at least one of the number of blocks, a block size, and a sequence number for a PDCP PDU discarded or to be discarded according to indication information included in the mandatory fields.

5. The method according to claim 1, wherein the downlink data transfer status information includes PDU type information and retransmission status information of the downlink data packet.

6. The method according to claim 1, wherein the downlink user data information or the downlink data transfer status information includes frame version information for a frame format of information to be transferred.

7. A method of controlling downlink data transmission by a base station, the method comprising:
   configuring an X2 interface for transmitting downlink data to user equipment by interworking with a second base station;
   transmitting downlink user data information including information indicating whether to perform retransmission of an associated downlink data packet to the second base station through the X2 interface; and
   receiving downlink data transfer status information from the second base station through the X2 interface,
   wherein a frame format of the downlink data transfer status information is configured to contain, as mandatory fields, a 4-bit PDU type field, a 1-bit data rate indication field, a 1-bit retransmission transfer field indicating whether a highest success retransmission PDCP sequence number field is present or not, and a 1-bit retransmission field indicating whether a highest retransmission PDCP sequence number field is present or not.

8. The method according to claim 7, wherein the highest success retransmission PDCP sequence number field includes information on a sequential transfer status of a PDCP PDU of a downlink data packet retransmitted to the user equipment by the second base station, and the highest retransmission PDCP sequence number field includes status information on a PDCP PDU of a retransmission downlink data packet transferred to a lower layer by the second base station.

9. The method according to claim 7, wherein the highest success retransmission PDCP sequence number field includes highest PDCP PDU sequence number information of a downlink data packet successfully retransmitted to the user equipment by the second base station, and the highest retransmission PDCP sequence number field includes highest PDCP PDU sequence number information of a retransmission downlink data packet transferred to a lower layer by the second base station.

10. The method according to claim 7, wherein, if a value of the data rate indication field is set to a value indicating presence of a desired data rate field, the frame format of the downlink data transfer status information is configured to contain the desired data rate field including information on an amount of data required to be received for a predetermined period of time for a specific data radio bearer set in the user equipment.

11. A base station controlling downlink data transmission, the base station comprising:
a controller configuring an X2 interface for transmitting downlink data to user equipment by interworking with a second base station;
a transmitter configured to transmit downlink user data information including information indicating whether to perform retransmission of an associated downlink data packet to the second base station through the X2 interface; and
a receiver configured to receive downlink data transfer status information from the secondary base station through the X2 interface,
wherein the downlink user data information is configured in a frame format including a 4-bit PDU type field and a 1-bit retransmission flag field, and
wherein the frame format of the downlink user data information further includes i) a PDCP PDU sequence number field of the downlink data packet transferred from the base station to the second base station, in association with a specific single data radio bearer (DRB), ii) a 1-bit downlink (DL) Flush field indicating presence of a discarded downlink PDCP PDU sequence number, and iii) a 1-bit DL Discard Blocks field indicating presence of a downlink PDCP PDU block to be discarded.

12. The base station according to claim 11, wherein the second base station is configured to use a radio access technology different from the base station, and configures dual connectivity with the base station for the user equipment to transmit and receive data.

13. The base station according to claim 11, wherein the frame format of the downlink user data information includes the PDU Type field, a Retransmission flag field, a PDCP PDU sequence number field, a DL Flush field, a DL Discard Blocks field, as mandatory fields, and includes at least one optional field including at least one of the number of blocks, a block size, and a sequence number for a PDCP PDU discarded or to be discarded according to indication information included in the mandatory fields.

14. The base station according to claim 11, wherein a frame format of the downlink data transfer status information includes, as mandatory fields, a 4-bit PDU type field, a 1-bit data rate indication field, a 1-bit retransmission transfer field indicating whether a highest success retransmission PDCP sequence number field is present or not, and a 1-bit retransmission field indicating whether a highest retransmission PDCP sequence number field is present or not.

15. The base station according to claim 14, wherein the highest success retransmission PDCP sequence number field includes information on a sequential transfer status of a PDCP PDU of a downlink data packet retransmitted to the user equipment by the second base station, and the highest retransmission PDCP sequence number field includes state information on a PDCP PDU of a retransmission downlink data packet transferred to a lower layer by the second base station.

16. The base station according to claim 14, wherein the highest success retransmission PDCP sequence number field includes highest PDCP PDU sequence number information of a downlink data packet successfully retransmitted to the user equipment by the second base station, and the highest retransmission PDCP sequence number field includes highest PDCP PDU sequence number information of a retransmission downlink data packet transferred to a lower layer by the second base station.

\* \* \* \* \*